Jan. 13, 1942.    H. W. ZIMMERMAN    2,269,503
TORQUE MEASURING WRENCH
Filed May 31, 1938    3 Sheets-Sheet 1

Inventor:
Herman W. Zimmerman
By Davis, Lindsey, Smith & Shonts
Attys.

Jan. 13, 1942. H. W. ZIMMERMAN 2,269,503
TORQUE MEASURING WRENCH
Filed May 31, 1938 3 Sheets-Sheet 3

Inventor:
Herman W. Zimmerman
by Davis, Lindsey, Smith & Shonts
Attys.

Patented Jan. 13, 1942

2,269,503

UNITED STATES PATENT OFFICE 2,269,503

TORQUE MEASURING WRENCH

Herman W. Zimmerman, Highland Park, Ill., assignor, by mesne assignments, to Automotive Maintenance Machinery Co. North Chicago, Ill., a corporation of Illinois Application May 31, 1938, Serial No. 210,869

23 Claims. (Cl. 265—1)

My invention relates to torque measuring wrenches adapted for determining the force or torque applied therethrough to work such as nuts, bolts, studs and the like.

One of the objects of my invention is to provide an improved torque measuring wrench which is of a simple, inexpensive, rugged and compact construction, and which is adapted to efficiently perform its torque measuring and indicating functions with precision at all times and under all normal conditions of use.

Another object is to provide an improved indicating mechanism for torque measuring wrenches which is of a very simple and inexpensive construction, embodies but few operating parts, is durable and capable of withstanding rough usage, is adapted to accurately record the force or torque applied through the wrench, and is so constructed and arranged that it may be readily and quickly assembled as a complete unit with the remainder of the wrench structure.

A further object is to provide a torque measuring wrench that is well adapted for uniform reproduction in large quantities for production purposes, the arrangement being such that but few wrench parts are employed, which parts are of a character adapted for accurate reproduction in large quantities, and which may be assembled without special selection in wrenches having the same power rating and having the ability to do the same work with uniformity in action and accuracy. The wrench parts are so constructed that corresponding parts of different wrenches having the same power rating may be interchanged without variation in the intended operation and power rating of the wrenches.

Other objects are to provide a wrench of the foregoing character having a pair of relatively movable parts with an elongated spring member engaged at its opposite ends with such parts and yieldably opposing relative movement therebetween, the arrangement being such that the connections between the movable parts and between such parts and the spring member are of precision character adapted to be accurately reproduced in successive wrenches, enabling the connected parts of different wrenches to be interchanged without impairing the intended accuracy of the wrench; to provide an improved connection between relatively movable wrench parts and the gage mechanism by which the gage mechanism may be readily and easily applied and removed without detachment of any of the other wrench parts, and which is of a character adapted to absorb shocks experienced in the use of the wrench, thereby tending to minimize injury to the gage mechanism; to provide means for insuring return of the gage mechanism to its normal position of rest notwithstanding play or backlash in gears employed in the gage mechanism; to provide improved visual means associated with the gage mechanism by which the operator may readily determine from various angles when the desired pressure is applied to the work; to provide a wrench that may be readily and easily assembled, disassembled and used by an unskilled workman; and to provide a simple and inexpensive, but efficient, ratchet unit that may be readily and detachably applied to the wrench.

Other objects and advantages will become apparent as this description progresses and by reference to the drawings wherein—

The wrench shown in Figs. 1 to 7, inclusive, comprises a hollow head portion 20 having a top cover 21 detachably secured thereto by a plurality of screws 22 that engage threaded openings 23 in bosses 24 formed on the inner wall of the head 20. The head 20 is provided with a rearwardly extending integral handle 25 having a grip portion 25ᵃ adapted to receive and position the hand of an operator in the use of the wrench. If desired, however, the rear end of the wrench head 20 may be provided with a socket (not shown) in which a separate handle-piece is secured.

The head 20 rotatably supports a work-engaging member 26. The work-engaging member 26 is provided with an annular body portion 27 having reduced annular bearings 28 extending axially from the opposite sides thereof for rotatable reception in aligned openings 29 formed in adjacent and opposite, thickened wall portions 30 at the forward end of the head 20. Anti-friction bearings 31 are mounted in the openings 29 whereby the work-engaging member 26 is mounted for rotation relative to the head 20 with a minimum of friction. The forward, inner end wall of the head 20 is rounded complementally to the work-engaging body 27, which is of less diameter than the head end wall, thereby providing a peripheral space 20ᵇ between these parts. The inner ends of the aligned head openings 29 are surrounded by narrow annular seat portions 32 against which the outer edges of the opposite faces of the work-engaging body 27 engage. By such an arrangement, together with the anti-friction bearings 31, the head 20 and work-engaging member 26 are adapted for relative rotation with a minimum of friction.

Relative rotation between the head 20 and work-engaging member 26 is yieldably opposed by an elongated spring bar 33 which is connected at one end to the head 20 and at its other end to the member 26. More particularly, the work engaging member 26 is provided with a rearwardly extending rigid arm 34 disposed at right angles to the axis of rotation of the member 26, which arm has a web-shaped central portion that reduces the weight of the arm without impairing its strength and rigidity. It is desired that the arm 34 be sufficiently rigid to prevent flexing of the same in the use of the wrench and, to that end, it is first formed to the shape shown and then hardened in any suitable fashion.

Figure 1:
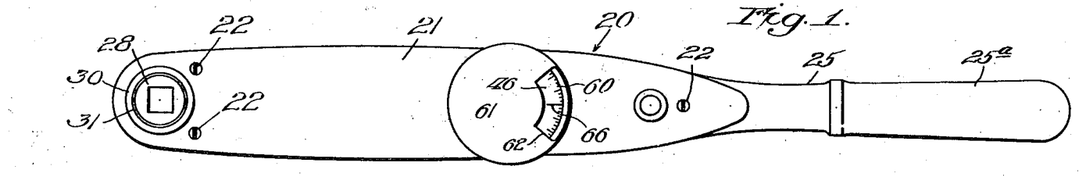
Figure 1 is a top plan view of one form of wrench embodying my invention.
Figure 2:
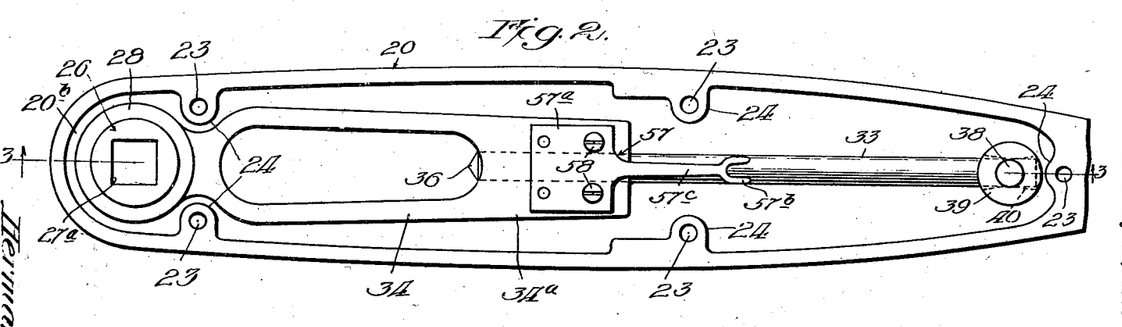
Fig. 2 is an enlarged view of the head portion of the wrench shown in Fig. 1, the top cover being removed to illustrate the internal wrench parts.
Figure 3:
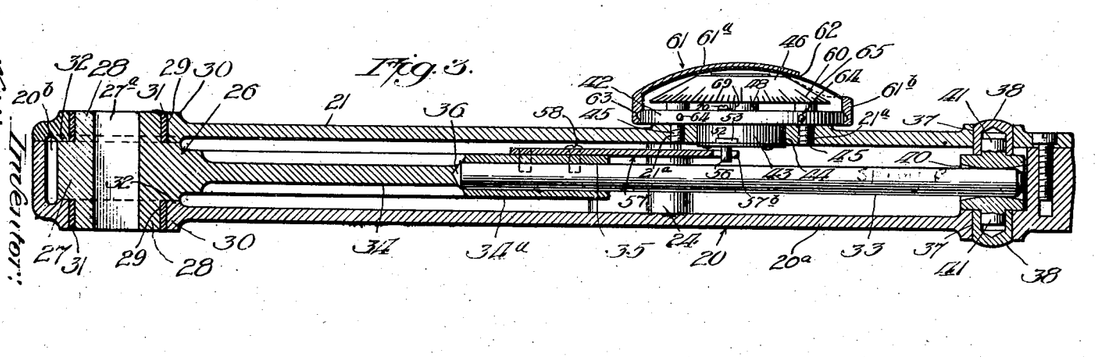
Fig. 3 is a longitudinal section taken substantially on the line 3—3 of Fig. 2.

By forming the arm 34 as stated, it is provided with a full section rear end portion 34ᵃ of predetermined size. This arm portion 34ᵃ is provided with an opening 35 extending substantially parallel with the longitudinal median line of the arm 34, which opening is adapted to receive the forward end of the spring bar 33. The opening 35 is drilled entirely longitudinally through the full section end 24ᵃ of the arm and until it breaks through the rear end thereof into the web portion providing air release ports 36 at the juncture with the web portion of the arm. In this way, the opening is readily formed to a predetermined length and diameter. The fit between the end of the spring bar 33 and the arm opening 35 is sufficiently close to provide a tight pressed fit between these parts, and by providing the openings 36 at the end of the arm opening, I am able to force the forward end of the spring bar 33 entirely home within the opening and until it abuts the rear end thereof as shown in Fig. 3. In this way, production of large quantities of wrenches is facilitated in that all work-engaging members and their arms may be similarly formed to receive similarly formed spring bars in exactly the same way.

The rear end of the spring bar 33 is rotatably connected to the rear end of the head 20 in the following manner: The bottom wall 20ᵃ of the head and the cover 21 thereof are provided, at the rear of the head 20, with aligned openings 37 in which are received thimble-like anti-friction bearing members 38 which are so positioned that their open ends extend inwardly of the head 20. Connection between the spring bar 33 and the head is directly accomplished by a cylindrical coupling member 39 which is provided with a transverse opening 40 in which the end of the bar 33 is freely received. The walls of the opening 40 flare or diverge outwardly at both ends from the axis of the coupling member so that the contact between such coupling member and the spring bar is substantially only at and on the axis of the coupling member. The coupling member 39 is provided at its opposite ends with axial journals 41 which are snugly and rotatably received in the bearings 38, the arrangement being such that the connection between the head 20 and the spring bar 33 is a rotatable one. This connection permits rotation between the coupling member 39 and the head 20, as well as limited rock movement between the bar 33 and the coupling member 39, so that the bar 33 will at all times be free to flex normally during operation without any cramping action or any other restriction which may tend to set up conditions causing the wrench to register abnormal forces.

I have found that a cylindrical spring bar is well adapted for the attainment of the purposes of my invention. Spring bars of this character may be formed and tempered quite accurately so that successive spring bars having the same power rating may be formed with but a slight and immaterial percentage of error.

The work-engaging body 27 is provided with an axial opening 27ᵃ. This opening is, preferably, of rectangular shape or any other shape adapted to non-rotatably and detachably receive a work-engaging adapter (not shown) of any suitable and well-known form. Preferably, I employ a work adapter which is arranged to connect the wrench and the work with the axes of the work and the work-engaging body 27 coinciding; however, where the work is difficult of access, different and off-center types of adapters may be employed in order to engage the wrench with the work. In the latter case, for accurate results, the hand grip portion 25ᵃ of the wrench handle should be grasped in a uniform manner in order to insure proper pressure indications when working on successive, related pieces of work which are to be set up to the same pressure.

When the work-engaging member 26 is engaged with the work and the handle 25 is grasped and moved in a clockwise direction (as viewed in Fig. 1), the head 20, work-engaging member 26 and the work, through the coupling afforded by the spring bar 33, move together as a unit until the work is tightened to a point wherein the initial tension of the spring bar 33 is overcome. As this happens and rotation of the wrench handle 25 is continued, the spring bar 33 will be flexed, permitting relative rotation between the head 20 and the member 26, the extent of which relative rotation depends upon the pressure applied and the extent of flexing of the spring bar 33. Therefore, by measuring the extent of this relative rotation, I am able to determine the amount of force or torque applied through the wrench to the work, and one form of gage mechanism well adapted to accomplish this will now be described.

The gage structure shown in Figs. 1, and 3 to 7, inclusive, is detachably supported by the cover-plate 21. The gage structure includes a disc-like body member 42 having an axial depending annular part 43 which is freely received in an opening 44 in the cover-plate 21. The plate 42 (Fig. 4) is detachably secured to the cover 21 by screws 45 which freely pass through slightly enlarged openings 42ᵃ in the plate 42 and engage threaded openings 21ᵃ in the cover 21. The foregoing arrangement provides some play in the unsecured gage mounting so that the gage unit may be shifted somewhat for proper connection with the wrench actuating means hereinafter described. When the parts are properly connected, the screws 45 are tightened, holding the gage in a predetermined position.

The gage structure takes the form of a self-contained unit, and it further includes a frusto-conical dial 46 formed of relatively thin and light-weight material such as Celluloid or the like. The top of the dial is provided with a metallic anchor member 47 having a depending annular part 47ᵃ adapted to be snugly received in a similarly shaped axial opening 48ᵃ formed in the upper end of a rotatable dial support 48. The upper end of the dial support 48 is provided with an enlarged head portion 48ᵇ providing with the anchor member 47 an adequate support for the dial 46. The dial 46 is detachably secured to its support 48 by a screw 49 passing through the anchor-piece 47 and engaging a threaded opening in the support 48.

The dial support 48 is adapted to seat and rotate upon the top of the body member 42, and rotation is imparted to it through a pinion 50 on the lower end of a shaft 51 axially secured to the lower end of the support 48. The shaft 51 is rotatably supported in an opening in the body member 42, the lower end of which opening is enlarged to provide a recess 52 in which the pinion 50 is received.

The pinion 50 is adapted to be actuated by a rack bar 53 which is also located in the recess 52. The rack bar 53 and pinion 50 are retained in operative relation by a comparatively thin plate 54 secured to the bottom of the part 43 by a plurality of screws 55. The rack bar 53 carries a centrally disposed and depending pin 56 which projects downwardly through an elongated slot 57 formed in the plate 54. By moving the rack bar 53 back and forth, the pinion 50 is rotated, in turn rotating the dial support 48 and the dial 46.

Movement of the sliding rack bar 53 by the relative rock movement of the wrench parts 20 and 26 is accomplished through a flat, bar-like coupling member 57, the forward end 57ᵃ of which (Figs. 2 and 3) is of enlarged rectangular-like shape and is secured to the rear end of the work-engaging arm 34 by screws 58. The coupling member is further provided with an elongated narrow stem part 57ᶜ having a fork 57ᵇ at its rear end. The coupling member stem 57ᶜ is of such length that its forks 57ᵇ is aligned with and receives the pin 56 carried by the rack bar 53. With this arrangement, as the wrench head 20 and the work-engaging member 26 rock relatively, the gage mechanism moves relatively to the coupling member 57, thereby imparting movement to the pin 56 and the rack bar 53, in turn, rotating pinion 50, dial support 48 and dial 46. The forked engagement between the coupling member 57 and pin 56 accommodates arcuate movement of these parts during their relative movement.

Wrenches of this character are subjected, at times, to severe shocks and movements which, unless otherwise guarded against, will tend to injure gear-type gage mechanisms. For example, if, in tightening a bolt, stud or other piece of work, breakage of the work should occur while a considerable pressure is being applied to the work, the instantaneous release and reverse actuation of the gage mechanism under the existing tension condition would tend to strip the gears of the gage mechanism. Also, in loosening a piece of work, considerable pressure may be required to move the work and the initial movement, once it is started, may be quite sudden so that the gage mechanism is subjected to shock and movement much like that which occurs when a piece of work breaks. In carrying out my invention, I avoid injury to the gage mechanism under the foregoing conditions by employing a gage coupling member 57 which is adapted to flex and absorb the shocks that are experienced under the conditions in question. Specifically, the coupling member 57 is formed of a high-grade steel material and the coupling arm 57ᵃ thereof is of such width that it will tend to flex when a predetermined pressure is applied to the forked end 57ᵇ thereof; but the pressure required to flex the arm 57ᵇ is greater than any pressure that will be exerted on the member 57 in the normal relative rotation of the wrench parts. In other words, the pressure normally exerted on the member 57 is only that required to move the sliding rack bar 53, pinion 50 and the dial unit, which pressure is necessarily very much less than that which would be suddenly exerted on the arm by the spring bar 33 in case of abrupt release of the parts with the spring bar under any considerable tension.

The side wall of the gage dial 46 (Fig. 3) is provided with a scale 60 graduated from zero in opposite directions to indicate, preferably, relative movement of the parts and pressure applied to the wrench in terms of inch-pounds pressure. The dial is enclosed by a removable and rotatably adjustable cover 61 having a dome-shaped top wall 61ᵃ and a depending annular side wall 61ᵇ. The top wall 61ᵃ of the cover is provided with a sector-shaped window 62 near its periphery through which the angularly disposed scale 60 of the dial 46 may readily be observed.

The cover 61 is detachably secured to the gage body member 42. Specifically, the cover side wall is provided near its bottom edge with an internal annular groove 63. The peripheral edge of the gage body 42 is provided with a plurality of apertures in which spring-pressed balls 64 are received, the arrangement being such that the cover 61 is adapted to be snapped upon the gage plate 42 with the balls 64 received in the grooves 63. In this way, outward accidental displacement of the cover is avoided and such cover may be rotated to any position relative to the dial where it will be held by the tension of the spring-pressed balls 64. The cover 61 may be removed intentionally by applying sufficient pressure to its lower edge to overcome the tension of the spring-pressed balls 64.

It will be appreciated that the operator, in using the wrench, may assume various positions in which he must observe the dial 46 from various angles. To facilitate the reading of the dial scale 60 under these conditions, the cover window 62, which is covered by a transparent member 65, is located in the inclined wall surface of the dome-shaped top 61a of the cover. This wall surface extends in a direction substantially parallel with the slanting side wall of the dial 46 on which the scale 60 is located. With such an arrangement, the operator may read the dial scale 60 at various angles from beyond the vertical to below the horizontal and from the opposite sides of the wrench. The transparent window 65 is provided with a centrally disposed indicating line 66 which is adapted to register with the graduations of the dial scale 60. In use, for example, the cover indicating line 66 may coincide with a zero point on the scale 60 when the wrench is at rest; and, if it is desired to set up a piece of work to a desired pressure, such pressure will have been reached when the dial 46 is rotated to an extent to register that pressure indication on the dial 46 with the indicating line 66. Or, if desired, the cover 61 may be rotated relative to the dial, in the at-rest position of the wrench, until its indicating line 66 coincides with a certain pressure graduation on the dial 46 and, when sufficient pressure is applied to the wrench to rotate the dial to bring its zero scale marking into coincidence with the line 66, the intended pressure has been applied.

Gage mechanism of the foregoing character must necessarily be sensitive and operate with precision. It is, therefore, highly desirable where the dial motion transmitting means includes gears to provide means compensating for play and backlash necessarily existent in the use of such gears. Otherwise, variation in the normal at-rest position of the dial may occur. To avoid any such condition, I provide spring means (Figs. 4 and 7) for always returning the dial when the wrench is at rest to a predetermined normal, at-rest position.

To the foregoing end, one side of the lower portion of the dial support 48 is provided with a concave cut-out 67 forming point contacts 68 that are engaged by an elongated spring member 69 having its opposite ends supported by posts 70 on the opposite sides of the member 48. The posts 70 are so located and the spring 69 is so shaped that the latter engages the points 68 under tension. With this arrangement, the dial support 48 will always be returned to its normal, at-rest position (Fig. 7) notwithstanding any play or backlash between the teeth of the slide rack bar 53 and pinion 50, due to the fact that the spring 69 always tends to rotate the member 48 to its center position with both of the contact points 68 engaged as the member 48 approaches its normal, at-rest position. The spring 69 further tends to act as a brake in steadying the rotative movement of the dial structure in any position thereof.

It will be seen from the foregoing that I have provided a highly efficient wrench while using but few parts in the wrench structure as a whole, including the gage mechanism. I have also provided an arrangement which may be quickly and easily assembled and disassembled without the necessity of using any particular care. That is, the work-engaging member may be first applied to the wrench head 20 and it is secured in place therein merely by applying and securing the cover plate 21. The gage mechanism may be readily applied as a unit, it being only necessary to insert the part 43 in the cover opening 44 at a position wherein the screws 45 will engage the openings 21a, in which position the depending rack bar pin 56 will be received in the forked end 57c of the coupling member 57. After the plate 42 with its dial support 48 are thus secured, the dial 46 may be secured to the support 48 and the cover 61 then snapped in place. For sake of precision in operation and also as an aid in reproduction of similarly powered and acting wrenches in large quantities, the axis of the rotatable connection between the head 20 and work-engaging member 26, the rotatable axis of the connection between the rear end of the spring bar 33 and the head 20, and the axis of the gage-receiving cover opening are all longitudinally aligned. This facilitates assembly and proper fit of the parts without the necessity of specially fitting and testing individual parts and wrenches.

Figure 4:
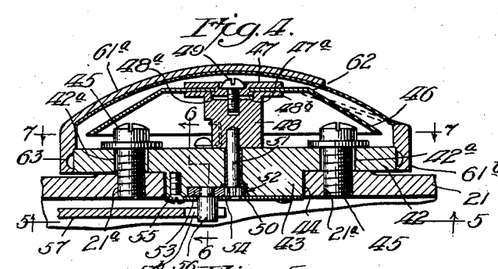
Fig. 4 is an enlarged vertical sectional view of the gage mechanism and the parts by which it is associated with the remainder of the wrench structure.
Figure 5:
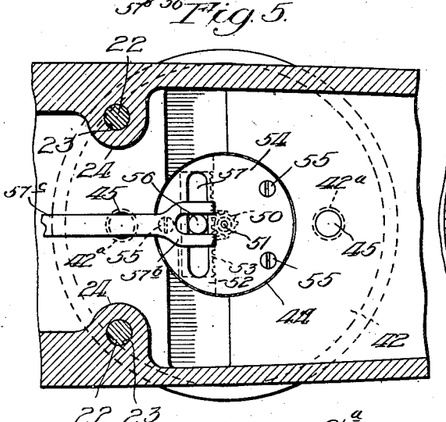
Fig. 5 is a horizontal sectional view taken substantially at the position indicated by the line 5—5 in Fig. 4.
Figure 6:
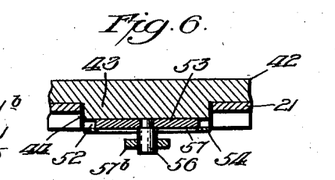
Fig. 6 is a detail sectional view taken substantially on line 6—6 of Fig. 4.
Figure 7:
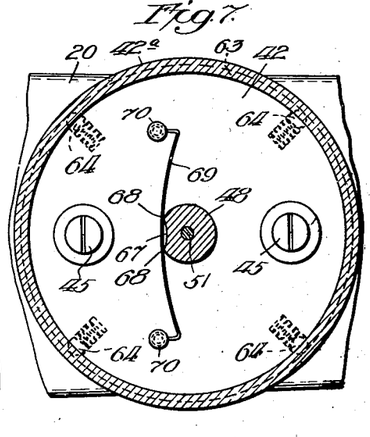
Fig. 7 is a horizontal sectional view taken substantially on line 7—7 of Fig. 4.
Figure 8:
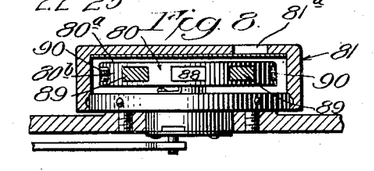
Fig. 8 is a vertical sectional view of another form of gage mechanism that may be employed in a wrench embodying my invention.
Figure 9:
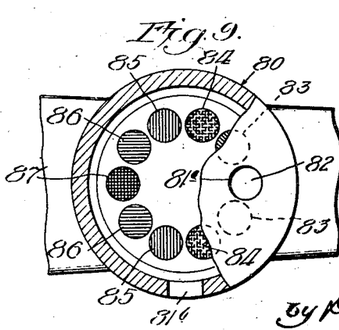
Fig. 9 is a top plan view of the structure shown in Fig. 8, a portion of the upper part of such structure being shown in section.
Figure 10:
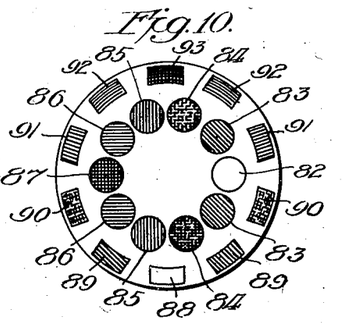
Fig. 10 is a diagrammatic outline view of the dial structure shown in Figs. 8 and 9, and by which the relationship of the top and side dial markings is better shown.

I have also found that the weight of the dial is of importance from the standpoint of injury to gear mechanism upon sudden operations causing shocks in the use of the wrench. In other words, the lighter the dial structure, the more satisfactory it is from the foregoing standpoints. For that reason, as above stated, the dial 46 is formed of very thin and light-weight material which may be readily applied to rotatable supporting structure, as shown in Fig. 4, without the use of weight-increasing liners or supports.

It will be understood that the dial may take various shapes and may carry different indicating media such, for example, as those shown in Figs. 8 to 10 and 12 to 14. Specifically, with respect to Figs. 8 to 10, inclusive, the gage structure illustrated is similar to that previously described except that the dial 80 is provided with a flat top 80a and a skirt 80b extending at substantially right angles thereto. The cover 81 is similarly shaped, being provided with a circular opening 81a in its top and a rectangularly-shaped opening 81b in its skirt, the two openings being located approximately 90 degrees apart.

The dial 80 is provided with color indicia on both the top and skirt thereof, each color indicating a certain pressure or a certain desired position which the gage is to assume in order to properly set up a piece of work. More particularly, the top of the dial is provided with a plurality of colored discs that are adapted to coincide with the top cover opening 81a. These discs may be so arranged that in the normal, at-rest position of the wrench a white disc 82 registers with the cover opening 81a. Extending both clockwise and counterclockwise (as viewed in Fig. 10) from the white disc 82, the discs 83 may be colored green, the discs 84 may be yellow, the discs 85 may be red, the discs 86 may be blue, and the disc 87 may be black. Likewise, the side wall of the dial may be provided with a white area 88 adapted to coincide with the side wall cover opening 81b in the normal, at-rest position of the wrench, and it may also be provided with oppositely extending rows of green areas 89, yellow areas 90, red areas 91, blue areas 92 and a black area 93. The arrangement of the discs on top of the dial and the squares in the skirt thereof is such that when a disc of any particular color, upon movement of the wrench in either direction, as to tighten or loosen the work, registers with the top cover opening 81ª, a similarly colored disc will register with the opening 81ᵇ in the side wall of the cover. In this way, the operator is able to determine the pressure indicated by the wrench from the various positions that he may assume in using the wrench. I have found dial structure of this character to be useful where the wrench is to be used for different kinds of work that is to be set up to different pressures. Each color may indicate a certain pressure and, following instructions given as to the pressure indicated by each color, the workman using the wrench need only be instructed to set up one piece of work to the yellow color, another piece to red, another to blue, etc. Or, if desired, the cover 81 may be rotated so that its openings register with a particular color, instructions being given to set up the piece of work until the white color marks register with the cover openings.

Figure 12:
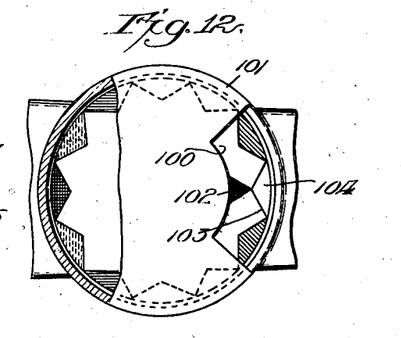
Fig. 12 is a top plan view, partially in section, of another form of gage mechanism embodying my invention.

In Fig. 12 I have shown a dial similar to that just described, except that the dial and cover therefor are shaped similarly to the corresponding parts shown in the first-described form. In this form, the transparent window 100 of the cover 101 is provided with a black V-shaped indicating mark 102. The slanting side wall of the dial is provided with a plurality of inverted V-shaped color zones 103 which may be colored similarly to the areas shown in Fig. 10, or in any other way desired. In this form, I may employ a white zone 104 which, when its apex coincides with that of the black mark 102 on the cover, indicates the normal, at-rest or zero position of the device. Relative movement between the wrench parts results in movement of the dial color zones relative to the black cover mark 102 and any particular color zone may represent a predetermined pressure condition or the extent to which any particular piece of work should be tightened.

Figure 13:
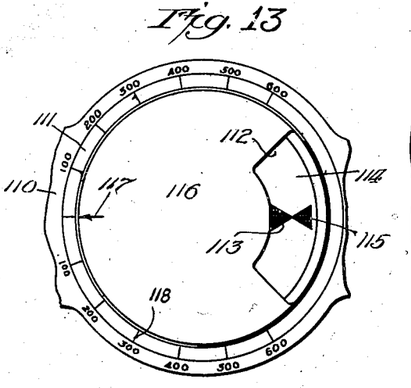
Figs. 13 and 14 are top plan views of additional forms of gage mechanism embodying my invention.

In Fig. 13 I have shown a dial arrangement shaped similarly to that of Figs. 4 and 12 but having different pressure indicating means. In this form, the top cover 110 of the wrench is provided with a scale 111 having a zero point and graduations extending in opposite directions therefrom indicating, preferably, inch-pounds pressure. The transparent cover window 112 is provided with a V-shaped black indicating mark 113 and the slanting side wall 114 of the dial is provided with a triangularly shaped indicating mark 115. In the zero position of the wrench parts, the apexes of the marks 113 and 115 coincide. If it is desired to set up a piece of work to a point requiring the application of, say 300 inch-pounds pressure, the cover 116 is rotated in clockwise direction( as viewed in Fig. 13) until its arrow mark 117 coincides with the 300 mark 118 on the scale 111. With the wrench so set, the work is then tightened until a sufficient pressure is exerted to cause rotation of the dial 114 in a clockwise direction to bring its indicating mark 115 into alignment with the cover mark 113. Indications are given in a similar manner when the wrench is rotated in the opposite direction, as when loosening the work.

Figure 14:
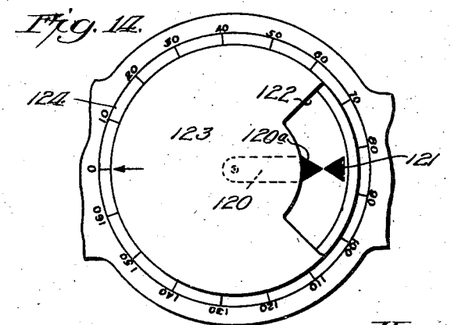

In Fig. 14 I have shown an indicating means similar to that of Fig. 13 except that a hand or pointer 120 is used instead of a dial such as shown in Figs. 4 and 13. In this form, the outer end 120ª of the hand or pointer is V-shaped and in the normal zero position of the wrench its apex coincides with that of a triangularly shaped mark 121 on the transparent window 122 of the cover 123. In this form, a scale 124 similar to the scale 111 of Fig. 13 is employed and the device is used in the same way as that of Fig. 13. The use of a hand 120 instead of a complete dial still further reduces the weight of the rotating dial structure, thereby further aiding in precision of operation.

Figure 11:
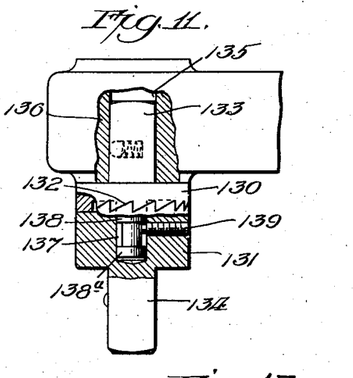
Fig. 11 is a fragmental view, partially in section, of a ratchet form of wrench embodying my invention.

At times it may be desirable to use a wrench of the foregoing character with a ratchet feature and, for that purpose, I provide an improved form of ratchet unit that may readily be attached to and disconnected from the wrench. One form of the unit that I employ is shown in Fig. 11.

Specifically, the ratchet structure includes a pair of ratchet heads 130 and 131, each of which is provided with ratchet teeth 132 adapted to be engaged in the manner illustrated. These heads also are provided on their outer surfaces with axial extensions 133 and 134, respectively, which are adapted to non-rotatably engage in irregularly shaped opening 135 of the work-engaging member 136 or in a similar opening formed in a work adapter (not shown). The head 131 is further provided with an axial recess 137 in which is received the enlarged head 138ª of a pin or projection 138 axially carried by the head 130. A screw 139 carried by the head 131 is provided with a reduced end portion projecting into the recess 137 where it is adapted to be engaged by the head 138ª of the pin 138, thereby limiting the extent to which the ratchet heads may be separated. The extent of this movement need only be slightly greater than the depth of the ratchet teeth 132 whereby the ratchet heads may be separated in axial direction for movement of one relative to the other as in the non-ratcheting movement of the ratchet structure. The wrench structure may be similar to that shown in Figs. 1 to 3, inclusive, or it may take any other form suitable for connection with the ratchet unit. In the use of the structure, with the ratchet unit engaged with the work, the weight of the wrench is normally sufficient to move and hold the uppermost ratchet head in operative engagement with the lower ratchet head. If the work is being tightened, backward or counterclockwise movement of the wrench will result in the ratchet teeth of the lower ratchet head camming the ratchet teeth of the upper head out of engagement therewith so that no movement of the work takes place; but, upon the reverse movement of the wrench, the teeth normally move into engagement with each other and form a rigid unit through which pressure is directly applied to the work. Either shank extension of the ratchet unit may be connected to the wrench, which is an added convenience in applying the ratchet unit. Also, the ratchet unit may be employed as an accessory for other types of wrenches and for converting the same for ratchet operation. It will be seen from the foregoing that I have provided a very simple and inexpensive ratchet structure which embodies but few parts, none of which is of a character likely to get out of working condition in the ordinary use of the wrench.

I believe that the operation and advantages of my invention will be apparent from the foregoing description. The wrench embodying my invention is not only simple in construction but it is inexpensive to manufacture. At the same time, the wrench is adapted to accurately measure the pressures applied. The parts of the wrench are such that they may be accurately reproduced and stocked so that successive wrenches may be assembled from parts indiscriminately selected, thereby providing a wrench capable of satisfactory manufacture on a large production basis. Individual selection, testing and adjusting of wrenches is not necessary.

I claim:

1. A torque measuring wrench comprising an elongated head member, a work-engaging member rotatably mounted in said head member at the front end thereof and having a part exteriorly accessible for connection with the work, a rigid arm on said work-engaging member extending rearwardly within said head member and having a longitudinal opening of predetermined size leading from its rear end toward the axis of rotation of said work-engaging member and at right angles thereto, said arm also having at least one vent opening connecting the inner end of said opening to atmosphere, an elongated spring bar in said head member and having one end shaped similarly to said arm opening and fitted therein so that such bar end extends substantially to the inner end of said arm opening, means connecting the other end of said spring bar to said head member so that said spring bar serves as the sole means opposing relative movement between said members, and means for associating one of said members with an indicating means adapted for measuring relative movement between said members in a manner to indicate pressure applied to the work.

2. A torque measuring wrench adapted for use with means for indicating the force applied by the wrench to the work comprising an elongated head member having top and bottom walls, a work-engaging member rotatably mounted in the top and bottom walls of said head member, a spring bar having one end secured to said work-engaging member, and a connection between the other end of said spring bar and said head member whereby said spring bar opposes relative movement of said members, said connection including a bar-supporting member having an opening therein in which the end of said spring bar is freely received, said head member having aligned openings in the top and bottom walls thereof with their axes extending substantially parallel with the axis of rotation of said work-engaging member, bearing elements secured in said head member openings, and a pair of oppositely extending and axially aligned bearing members on said bar-supporting member and extending at substantially right angles to said bar-receiving opening and rotatably received in said bearing elements.

3. A torque measuring wrench adapted for use with means for indicating the force applied by the wrench to the work comprising an elongated head member having top and bottom walls, a work-engaging member rotatably mounted in the top and bottom walls of said head member, a spring bar having one end secured to said work-engaging member, and a connection between the other end of said spring bar and said head member whereby said spring bar opposes relative movement of said members, said connection including a bar-supporting member having an opening therein in which the end of said spring bar is freely received, said head member having aligned openings in the top and bottom walls thereof with their axes extending substantially parallel with the axis of rotation of said work-engaging member, thimble-shaped anti-friction bearing elements mounted in said head member openings with their open ends extending inwardly toward each other, and axially aligned bearing members on said bar-supporting member and rotatably received in said bearing elements.

4. A torque measuring wrench adapted for use with means for indicating the force applied by the wrench to the work comprising a head member having top and bottom walls, a work-engaging member rotatably mounted in the top and bottom walls of said head member, a spring bar having one end secured to said work-engaging member, and a connection between the other end of said spring bar and said head member whereby said spring bar opposes relative movement of said members, said connection including a bar-supporting member having opposed and axially aligned bearing members, said bar-supporting member also having a bar-receiving opening extending therethrough at substantially right angles to the axis of said bearing members, the opposite end walls of which opening converge inwardly toward the mid-portion of such opening so that said bar is normally engaged therein substantially on the axis of said bearing members, said bearing members being rotatably carried by the top and bottom walls of said head member.

5. A torque measuring wrench comprising a head member having top and bottom walls, said head member having aligned circular openings at the forward end thereof in said top and bottom walls, aligned circular openings at the rear end thereof in said top and bottom walls and an intermediate opening in said top wall, all of said openings having their centers substantially longitudinally aligned with each other, a work-engaging member having parts rotatably mounted in said forward openings, a spring bar connected at one end to said work-engaging member, a connection between the other end of said bar and said head member including a member having parts rotatably mounted in said rear openings, whereby said bar serves as the sole means opposing relative movement between said head and work-engaging members, mechanism indicating the pressure applied to the work including a part fitting in said intermediate opening, operating means supported by said mechanism part, coupling means operably connecting said work-engaging member with said operating means, said rotatably mounted parts being so constructed and arranged and all said openings so aligned that said coupling means and operating means are operably engaged merely by moving said mechanism part to one predetermined position relative to said coupling means and inserting it axially within said intermediate opening.

6. A torque measuring wrench comprising a pair of members rockably connected together, means by which one of said members may be engaged with the work, means on the other of said members by which it may be moved, spring means yieldably opposing rock movement between said members, gage mechanism carried by one of said members and including an operating part movable back and forth, and coupling means carried by the other of said members and having an element adapted to receive said operating part for moving the latter back and forth as said members rock relatively, said coupling means being adapted to flex in the direction of movement of said operating part.

7. A torque measuring wrench comprising a pair of members rockably connected together, means by which one of said members may be engaged with the work, means on the other of said members by which it may be moved, spring means yieldably opposing rock movement between said members, gage mechanism carried by said other member and including an operating part movable back and forth, and a coupling member connected at one end to said one member and having its other end free and constructed to receive said operating part for imparting motion thereto as said members rock relatively, said coupling member being adapted to flex when subjected to pressure greater than that required to impart motion to said operating part, whereby shocks caused by release of the wrench when said spring means is under operating tension is absorbed by said arm, preventing injury to the operating parts of the gage mechanism.

8. A torque measuring wrench comprising a pair of members rockably connected together, means by which one of said members may be engaged with the work, means on the other of said members by which it may be moved, spring means yieldably opposing rock movement between said members, pressure indicating means carried by said other member and including a rotatable indicator, gear means for rotating said indicator, a member slidable back and forth for operating said gear means, and a coupling member connected at one end to said one member and having its other end free and of suitable shape for receiving said slidable member and for actuating the latter upon relative rock movement of said members, said coupling member being constructed and arranged to flex when subjected to pressures greater than the pressure exerted therethrough to actuate said slidable member whereby shock causd by release of the wrench parts when they are subjected to high work-applied pressures is absorbed by said coupling member, preventing injury of said indicating means.

9. A torque measuring wrench adapted for use with means for indicating the force applied by the wrench to the work comprising, a head member, a work-engaging member rotatably mounted in said head member, a spring bar having one end secured to said work-engaging member and a connection between the other end of said spring bar and said head member whereby said spring bar opposes relative movement of said members, said connection including a supporting member having bearing means rotatably supported in said head member, said supporting member also having an opening extending therethrough at substantially right angles to the axis of said bearing means, and the wall of said opening converging inwardly in such a manner as to provide a substantially line contact with said spring bar.

10. A torque measuring wrench comprising a head member having top and bottom walls, said head member having aligned circular openings at the forward end thereof in said top and bottom walls, aligned circular openings at the rear end of said head member in said top and bottom walls and an intermediate opening in said top wall, a work-engaging member having parts rotatably mounted in said forward openings, a spring bar connected at one end to said work-engaging member, a connection between the other end of said bar and said head member including a member having parts rotatably mounted in said rear openings, said intermediate opening being constructed and arranged to receive an operating part of a pressure indicating mechanism, and means carried by said work-engaging member and adapted to be operably engaged with the operating part of the indicating mechanism merely by axial insertion of such mechanism part in said intermediate opening from a certain position relative thereto.

11. A torque measuring wrench comprising a pair of members rockably connected together, means by which one of said members may be engaged with the work, means on the other of said members by which it may be moved, spring means yieldably opposing rock movement between said members, gage mechanism carried by said other member, a pair of operating parts, one carried by said work-engaging member and the other by said gage mechanism, for operating said gage mechanism upon relative rock movement of said members, one of said parts being adapted to flex when subjected to pressure greater than that required to impart motion to the other of said parts, whereby shocks caused by release of the wrench when said spring means is under operating tension are absorbed by said operating parts thereby preventing injury to the gage mechanism.

12. A torque measuring wrench comprising a pair of members rockably connected together, means by which one of said members may be operably engaged with the work, means on the other of said members by which it may be moved, spring means yieldably opposing relative movement of said members, gage mechanism carried by one of said members and including an operating part movable back and forth, a coupling part operably associated with the other of said members, one of said parts being constructed and arranged for connection with the other part for causing simultaneous movement of both parts as said members rock relatively, one of said parts having flexing ability in a direction parallel with said simultaneous movement thereby tending to absorb shocks caused by release of the wrench when said spring means is under operating tension preventing injury to said gage mechanism.

13. A torque measuring wrench comprising a head member having top and bottom walls, one of said walls having an opening therein intermediate its ends, a work-engaging member having axially aligned parts rotatably mounted in the forward part of said head member, a spring bar connected at one end to and extending rearwardly from said work-engaging member, a connection between the other end of said bar and said head member including a member rotatably mounted in said head member, pressure indicating means including a depending operating part adapted to be received in said opening, and means movable upon relative movement of said work-engaging and head members and flexing of said spring bar, said means and said operating part being so relatively constructed and arranged that such means is operably engaged with said operating part merely by axial insertion of said part of the gage mechanism in said opening at a certain rotary position relative thereto.

14. A torque measuring wrench comprising, a pair of members rockably connected together, one of said members being adapted to be connected with the work and the other of said members being adapted to have a turning force applied thereto, a normally straight spring bar member yieldably opposing relative rock movement of said rockable members, indicator means carried by one of the members, and flexible means carried by another of the members and being cooperable with said indicator means for effecting an indication of the force applied to the work, said flexible means having relatively greater flexibility than said spring bar member in the direction of bending of said spring bar member.

15. A torque measuring wrench comprising, a pair of members rockably connected together, one of said members being adapted to be connected with the work and the other of said members being adapted to have a turning force applied thereto, a normally straight spring bar member yieldably opposing relative rock movement of said rockable members, indicator means carried by one of said members and including an operating-part, and flexible coupling means carried by another of said members and having an element adapted to be operably connected with said operating-part for effecting an indication of the force applied to the work, said flexible coupling means having relatively greater flexibility than said spring bar member in the direction of bending of said spring bar member.

16. A torque measuring wrench comprising a pair of members rockably connected together, one of said members being adapted to be connected with the work and the other of said members being adapted to have a turning force applied thereto, a normally straight spring bar member yieldably opposing relative rock movement of said rockable members, indicator mechanism carried by one of the members and including an operating-part movable back and forth in the direction in which said spring member bends as said members rock relatively, and flexible coupling means carried by another of the members and having an element adapted to be operably connected with said operating-part for moving the latter back and forth as said members rock relatively, said flexible coupling means having relatively greater flexibility than said spring bar member in the direction of bending of said spring bar member.

17. A torque measuring wrench comprising a pair of members rockably connected together, one of said members being adapted to be connected with the work and the other of said members being adapted to have a turning force applied thereto, a normally straight spring bar member carried by one of said rockable members and being operably engaged with the other of said rockable members and being adapted to flex as said rockable members rock relatively, indicator mechanism carried by one of said rockably-connected members and including an oscillatable indicator-operating part, and means carried by another of said members for coupling it to said indicator-operating part, said means including a flexible coupling element having operative engagement with said indicator-operating part, said coupling element having relatively greater flexibility than said spring bar member in the direction of bending of said spring bar member, whereby relative rock movement of said rockable members imparts movement to said coupling element and, in turn, oscillating movement to said indicator-operating part to operate said indicator mechanism and said flexible element tends to absorb the shock on said indicator mechanism in the event of a sudden release of the force being transmitted through the wrench.

18. A torque measuring wrench comprising, a pair of members rockably connected together, one of said members being adapted for engagement with the work and the other being adapted to be actuated to apply a turning force to the work, a normally straight flexible spring bar member carried by one of said rockable members and being operatively engaged with the other of said rockable members so as to yieldingly oppose relative rock movement of said rockable members, force indicating means carried by one of said rockable members and including an indicator-operating part, and means for coupling said indicator-operating part to one of the other of said members, said means including an elastic element having relatively greater flexibility than said spring bar member in the direction of bending of said spring bar member, whereby when said wrench is in use said indicating means will be actuated to indicate the force applied to the work upon relative rock movement of said rock members and said flexible element tends to absorb the shock on said indicating means in the event of a sudden release of the force being transmitted through the wrench.

19. A torque measuring wrench comprising, a head member, a work-engaging member rotatably mounted with respect to said head member and having a portion provided with a bore, said bore extending in a direction transverse to the axis of rotation of said work-engaging member, an elongated spring bar member having one end thereof securely mounted in said bore and having its opposite end operably connected with said head member for yieldably opposing relative rotary movement of said head member and work-engaging member, and indicator means operable as said head member and work-engaging member rotate relative to each other for indicating the force applied to the work through said members and spring bar.

20. A wrench as defined in claim 19, in which the bore is substantially circular in cross-section and in which at least the portion of the spring bar member which is mounted in said bore is of corresponding cross-section.

21. A torque measuring wrench comprising a head member, a work-engaging member rotatably mounted with respect to said head member and having a portion provided with a bore, said bore extending in a direction transverse to the axis of rotation of said work-engaging member, an elongated spring bar member having one end thereof securely mounted in said bore and having its opposite end swivelly connected with said head member for yieldably opposing relative rotary movement of said head member and work-engaging member, and indicator means operable as said head member and work-engaging member rotate relative to each other for indicating the force applied to the work through said members and spring bar.

22. A torque measuring wrench comprising, a head member, a work-engaging member rotatably mounted with respect to said head member and having a portion provided with a bore, an elongated spring bar member having one end thereof securely mounted in said bore and having its opposite end swivelly connected with said head member for yieldably opposing relative rotary movement of said head member and work-engaging member, indicator means, and flexible means operably connected with one of said members and with said indicator means for actuating said indicator means to indicate the force applied to the work through said members and spring bar.

23. A torque wrench adapted for use with means for indicating the force applied to the work comprising, a head member, a work-engaging member rotatably connected to said head member, an arm extending substantially radially from said work-engaging member, said arm having a longitudinal bore extending from its outer end toward the axis of rotation of said work-engaging member, an elongated spring bar yieldably opposing relative rotary movement of said head and work-engaging members, said spring bar having one end fixedly mounted in and extending substantially to the rear end of said longitudinal bore, means connecting the opposite end of said spring bar to said head member, said means being such as to permit pivotal movement of said spring bar relative to said head member, and means operable upon flexing of said spring bar and consequent relative rotary movement of said head and work-engaging members for operating said indicating means to indicate the force applied to the work.

HERMAN W. ZIMMERMAN.